United States Patent

Dewald, Jr. et al.

[11] Patent Number: 5,586,802
[45] Date of Patent: Dec. 24, 1996

[54] LINKAGE FOR GUIDING A RETRACTABLE ROOM

[76] Inventors: James E. Dewald, Jr.; Martin P. McManus; Patrick W. McManus, all of 1023 W. Eighth St., P.O. Box 703, Mishawaka, Ind. 46544

[21] Appl. No.: 438,765

[22] Filed: May 11, 1995

[51] Int. Cl.⁶ .................................................. B60R 27/00
[52] U.S. Cl. .................. 296/26; 296/171; 52/67
[58] Field of Search ............................ 296/26, 171, 175; 52/67

[56] References Cited

U.S. PATENT DOCUMENTS

| | | | |
|---|---|---|---|
| 2,561,921 | 7/1951 | Guillot | 296/171 |
| 4,669,773 | 6/1987 | LeVee | 296/37.8 X |
| 4,981,319 | 1/1991 | Gerzeny et al. | 296/26 |
| 5,061,006 | 10/1991 | Baughman | 296/26 X |
| 5,078,441 | 1/1992 | Borskey | 296/26 |
| 5,248,180 | 9/1993 | Hussaini | 296/171 |

FOREIGN PATENT DOCUMENTS

| | | | |
|---|---|---|---|
| 2840487 | 3/1980 | Germany | 296/26 |
| 2044343 | 10/1980 | United Kingdom | 296/26 |

*Primary Examiner*—Joseph D. Pape
*Attorney, Agent, or Firm*—Baker & Daniels

[57] ABSTRACT

A mobile living quarters includes a retractable or slide out room mounted for movement from a retracted position retracted within the main living area to an extending position providing auxiliary living area connected to the main living area. A scissors linkage is connected between the main frame and the retractable room for guiding the retractable room during extension and retraction and also equalizing forces on opposite sides of the retractable room to prevent binding. The scissors linkage includes a pair of arms which are pivotally connected to the frame of the mobile living quarters and to the retractable room. The pivots include a sliding pivot to accommodate sliding of the scissors arms as extension and retraction of the retractable or slide room occurs. A hydraulic actuator effects extension and retraction of the slide out room. The scissors linkage is mounted between the outer edge of one of the main frame member and the retractable room, thereby avoiding interference from other underbody components mounted on the frame members.

12 Claims, 8 Drawing Sheets

LINKAGE FOR GUIDING A RETRACTABLE ROOM

This invention relates to a linkage for guiding a retractable room which is retractable into the main living area of mobile living quarters such as a recreational vehicle or manufactured housing.

The width of recreational vehicles and manufactured housing is limited to that which can be accommodated for travel on public roads. Accordingly, it is common to provide recreational vehicles and manufactured housing with a slide out room which can be retracted into the main living quarters when the mobile living quarters is moved, but which can be extended from the main living quarters to provide auxiliary living space when the mobile living quarters is parked for use. Since the slide out room is a relatively large, heavy mass, a power actuator, such as a hydraulic ram, is used to effect extension and retraction of the slide out room. Furthermore, the size and mass of the slide out room is such that the slide out room tends to bind and stick during extension and retraction thereof unless forces are equalized across the room. One equalizing mechanism is that shown in our prior U.S. patent application Ser. No. 08/298,607.

The present invention relates to a linkage for guiding and equalizing the actuation forces across the retractable or slide out room during extension and retraction thereof. The linkage is mounted entirely between the main frame member and the frame member and the subframe member supporting the retractable room. Accordingly, the linkage does not interfere with other components such as tanks, other linkages, etc. that are mounted beneath the living quarters between the two main frame members. In one embodiment of the invention, the hydraulic actuator is also mounted between the main frame member and the subframe member supporting the retractable room, so that the entire actuation mechanism is mounted on the edge of the vehicle where it is least likely to interfere with other components. In the other embodiments of the invention, the hydraulic ram extends between the main frame members, but can be located to involve minimal interference with other components.

These and other advantages of the present invention become apparent from the following description, with reference to the accompanying drawings, in which.

Figure 1:
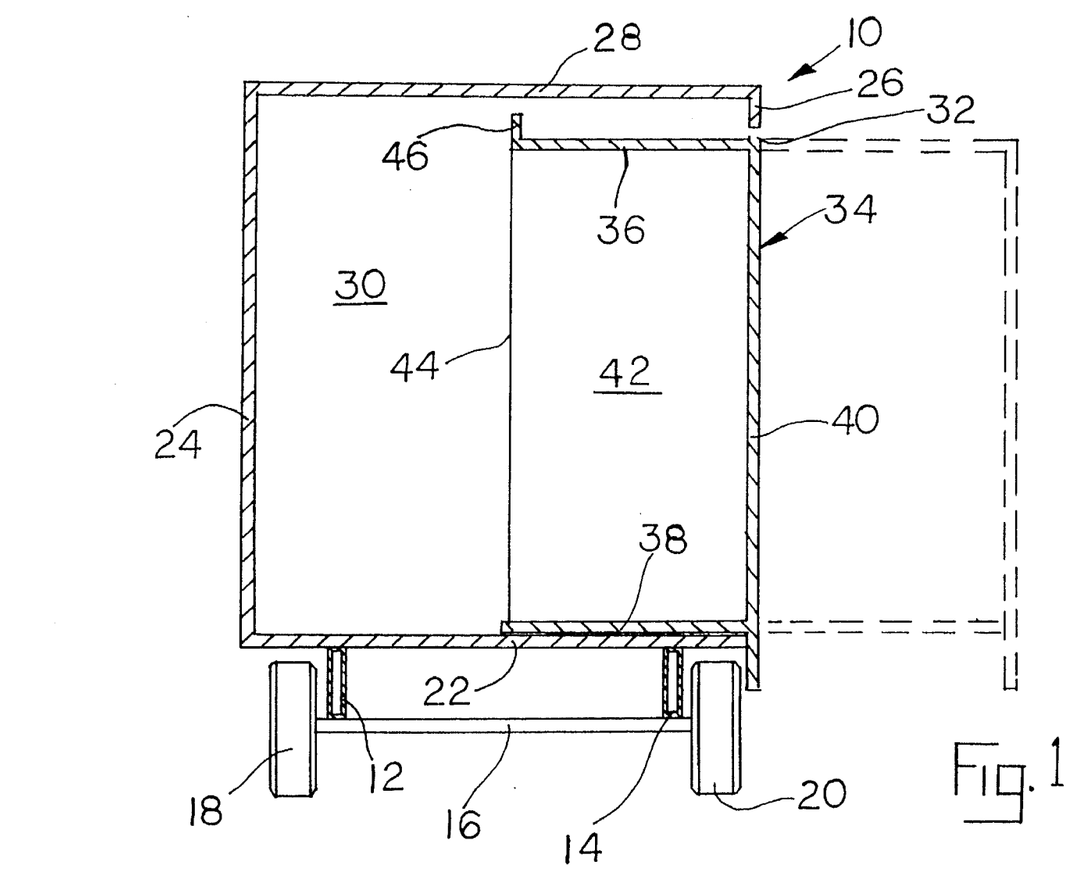
FIG. 1 is a cross sectional view of mobile living quarters incorporating a movable or slide out room; the room being shown in solid lines and its retracted position and in dashed lines in its extended position.

Referring now to the drawings, the mobile living quarters generally indicated by the numeral 10 includes a frame which includes a pair of spaced apart, longitudinally extending frame members 12, 14 that extend along the length of the living quarters 10 and which support an axle 16 carrying wheels 18, 20. Also mounted on elongated frame members 12, 14 is a main floor 22, with side walls 24, 26 extending therefrom which are interconnected by ceiling 28. The floor 22, the side walls 24, 26 and the ceiling 28 cooperate to define main living quarters 30. An opening 32 is formed in the wall 26 for receiving a slide out or retractable room generally indicated by the numeral 34. The retractable or slide out room 34 includes a ceiling 36, a floor 38, an outer wall 40 and side walls (only one being shown) 42. Side walls 42, ceiling 36, and floor 38 cooperate to define an open end 44, so that when they slide out or retractable room 34 is moved into the extended position illustrated by the dotted lines in FIG. 1, access is provided between the main living quarters 30 and the auxiliary living quarters provided by the slide out room 34. A lip 46 carried on the ceiling 36 and side walls 42 of the slide out or retractable room 34 extends at least part of the way around the opening 32 and is adapted to engage the side wall 26 to effect sealing between the retractable room 34 and the side wall 26 when the retractable room 34 is moved into the extended position.

Figure 2:
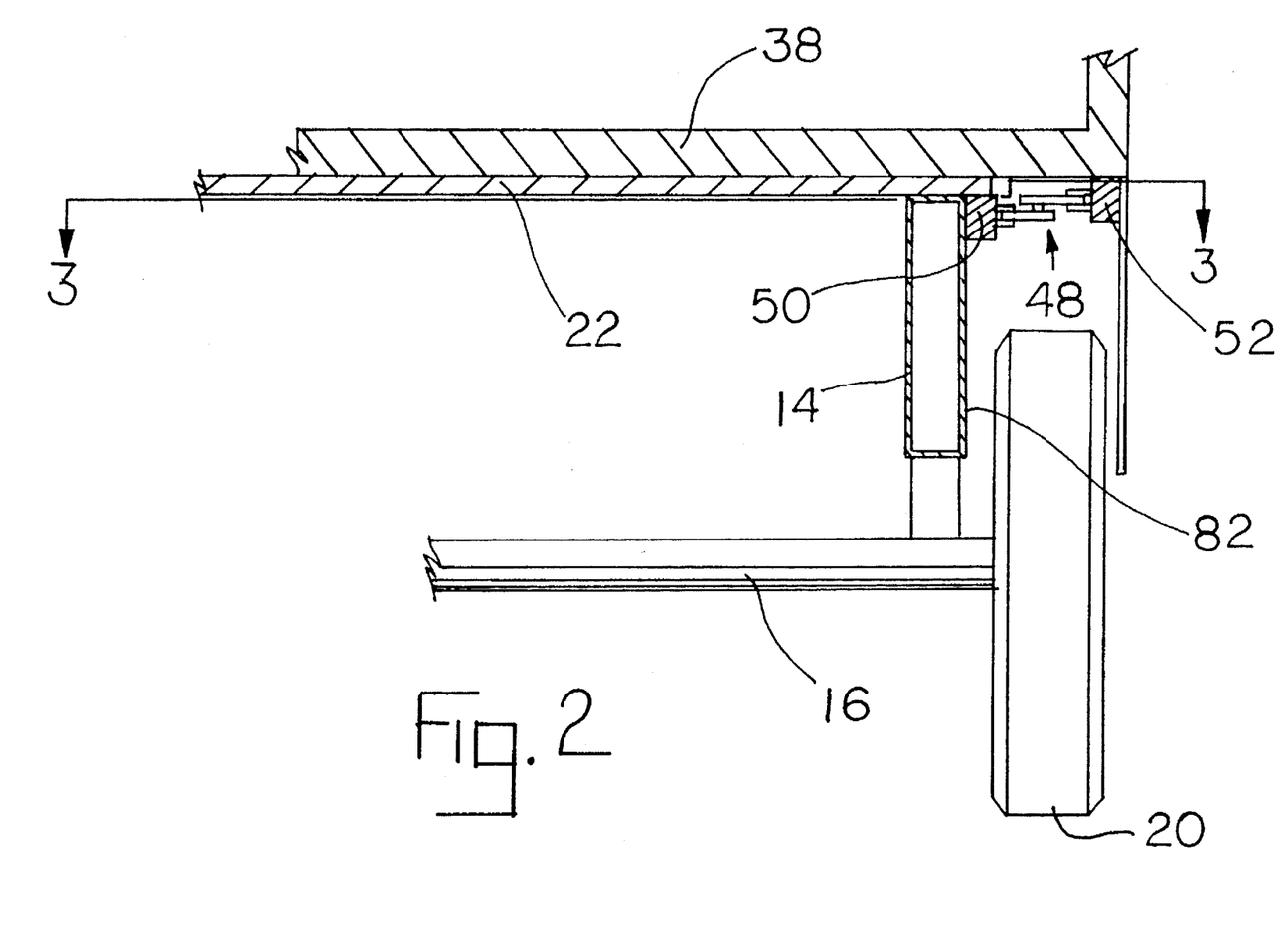
FIG. 2 is an enlarged, fragmentary, transverse cross sectional view of the mobile living quarters illustrated in FIG. 1 illustrating the linkage made pursuant to the present invention mounted in place on the retractable room and on the main frame member.
Figure 3:
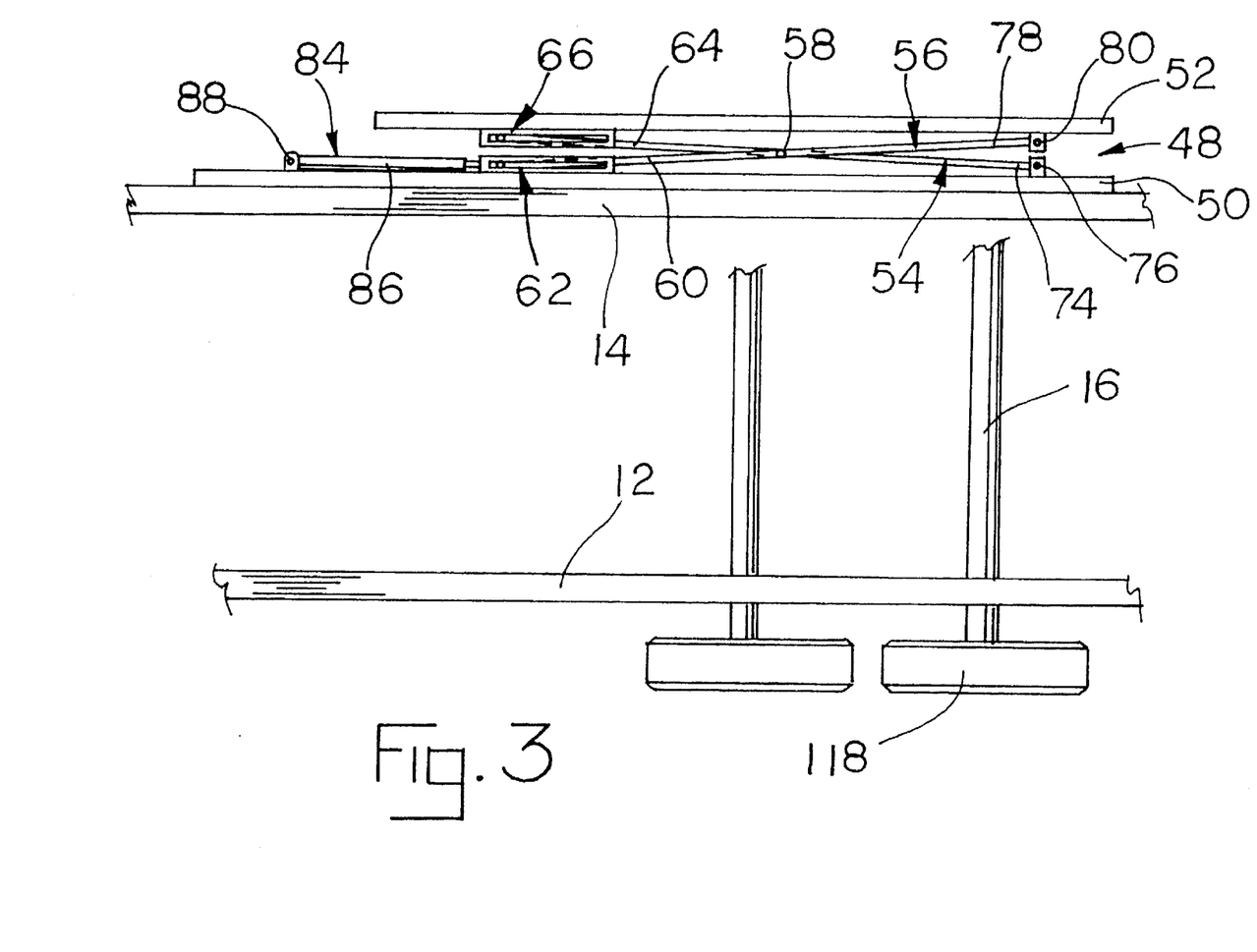
FIG. 3 taken substantially along line 3—3 of FIG. 2 and illustrating the linkage according to the present invention in its retracted position.
Figure 4:
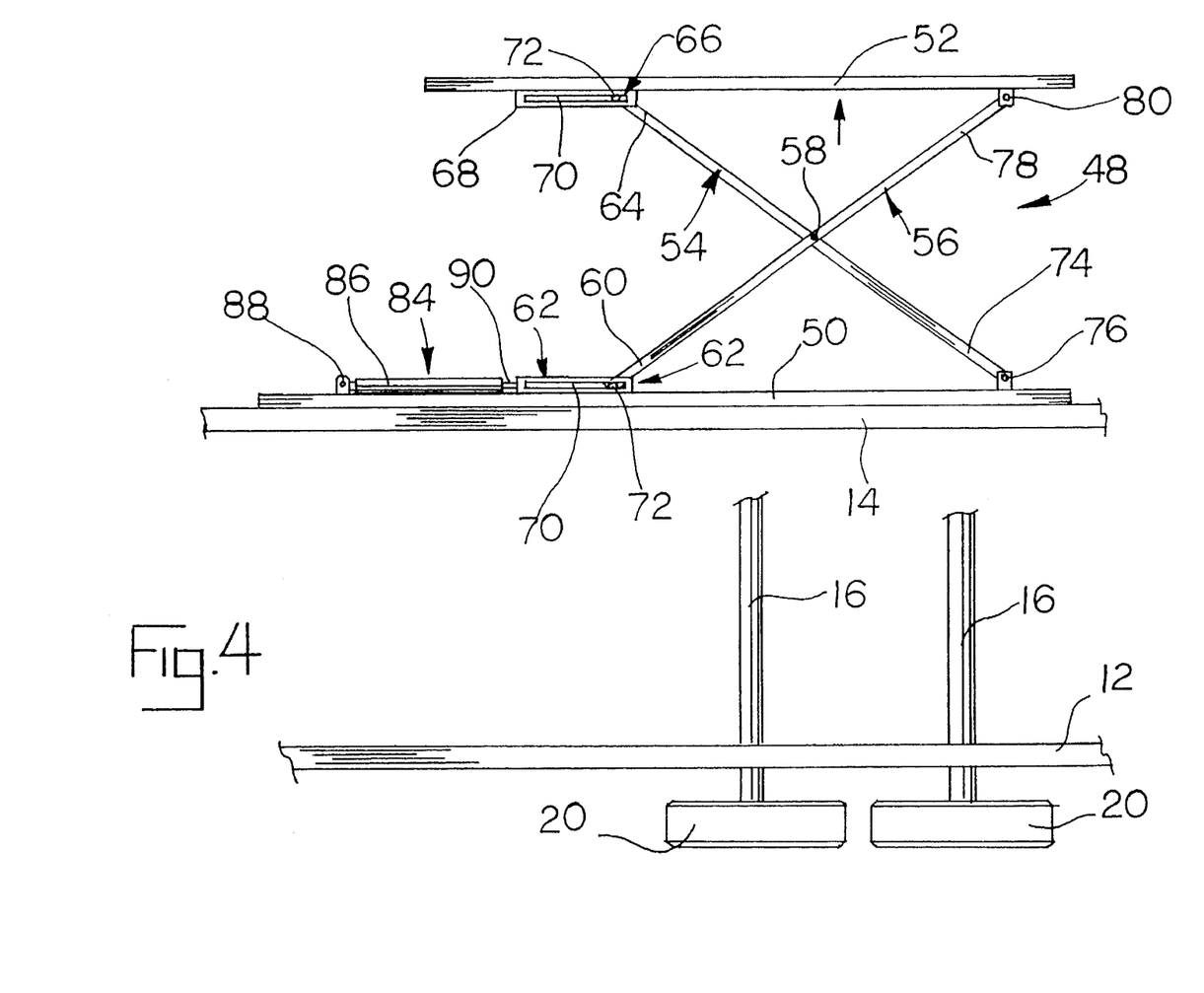
FIG. 4 is a view similar to FIG. 3 but illustrating the linkage according to the present invention in its extended position.

Referring now to FIGS. 2–4, a linkage generally indicated by the numeral 48 is connected between subframe 50 which is secured to and integral with the frame member 14, and a subframe 52, which is integral with the retractable or slide out room 30. The linkage 48 guides and equalizes the pushing/pulling forces applied to the slide out room during extension and retraction thereof. The linkage 48 is a scissors linkage having a pair of arms 54, 56 which cross one another and are connected by a pivot 58. One end 60 of the arm 56 is slidable and pivotally connected to subframe 50 by a pivot assembly generally indicated by the numeral 62, and one end 64 of the arm 54 is slidably and pivotally connected to subframe member 52 through sliding pivot generally indicated by the numeral 66. Sliding pivots 62, 66 each include a bracket 68 which is secured to the corresponding subframe member 50, 52. Each bracket 68 defines an elongated slot 70 which slidably receives a pivot pin 72 connected to the corresponding arm 60 or 64. The other end 74 of the arm 54 is pivotally connected to subframe member 50 by fixed pivot 76, and the other end 78 of the arm 60 is connected to subframe member 52 by fixed pivot 80. The subframe member 50 is secured to the outer face 82 of the frame member 14, and the subframe member 52 is secured directly to the floor 38 of the slide out or retractable room 34.

A hydraulic actuator generally indicated by the numeral 84 includes a cylinder 86 pivotally attached to subframe member 50 as at 88, and a piston rod 90 which extends from the cylinder 86 and extends below the bracket 68 to be connected to the pivot pin 72. Accordingly, when it is desired to extend the slide out or retractable room 34 from the retracted position, the hydraulic actuator 84 is actuated to extend the rod 90, which urges the end 60 of arm 56 to the right viewing FIGS. 3 and 4, into the FIG. 4 position. Accordingly, pivoting occurs about the pivot 58, 76 and 80 and both pivoting and sliding occurs with respect to the pivot pin 72 in the slots 70. Accordingly, the retractable room 34 is urged into the extended position in FIG. 1. Because of the connections between the arms 54, 56 and the slide out room, the force applied by the hydraulic actuator 84 is equalized across the length of the slide out room, thereby assuring both sides of the slide out room are extended at the same rate, to thereby prevent binding. Accordingly, the hydraulic actuator 84 can apply its force to the pivot pins 72 on one of the arms 56 and the force thereby applied will be equalized across the length of the slide out room. It will also be noted that the entire linkage 48 and the hydraulic actuator 84 are all mounted on the outboard face 82 of the frame member 14. Accordingly, none of the extension/retraction mechanism is mounted between the frame members 12 and 14, where space is often required to accommodate other vehicle components, such as tanks, other linkages, etc.

Figure 5:
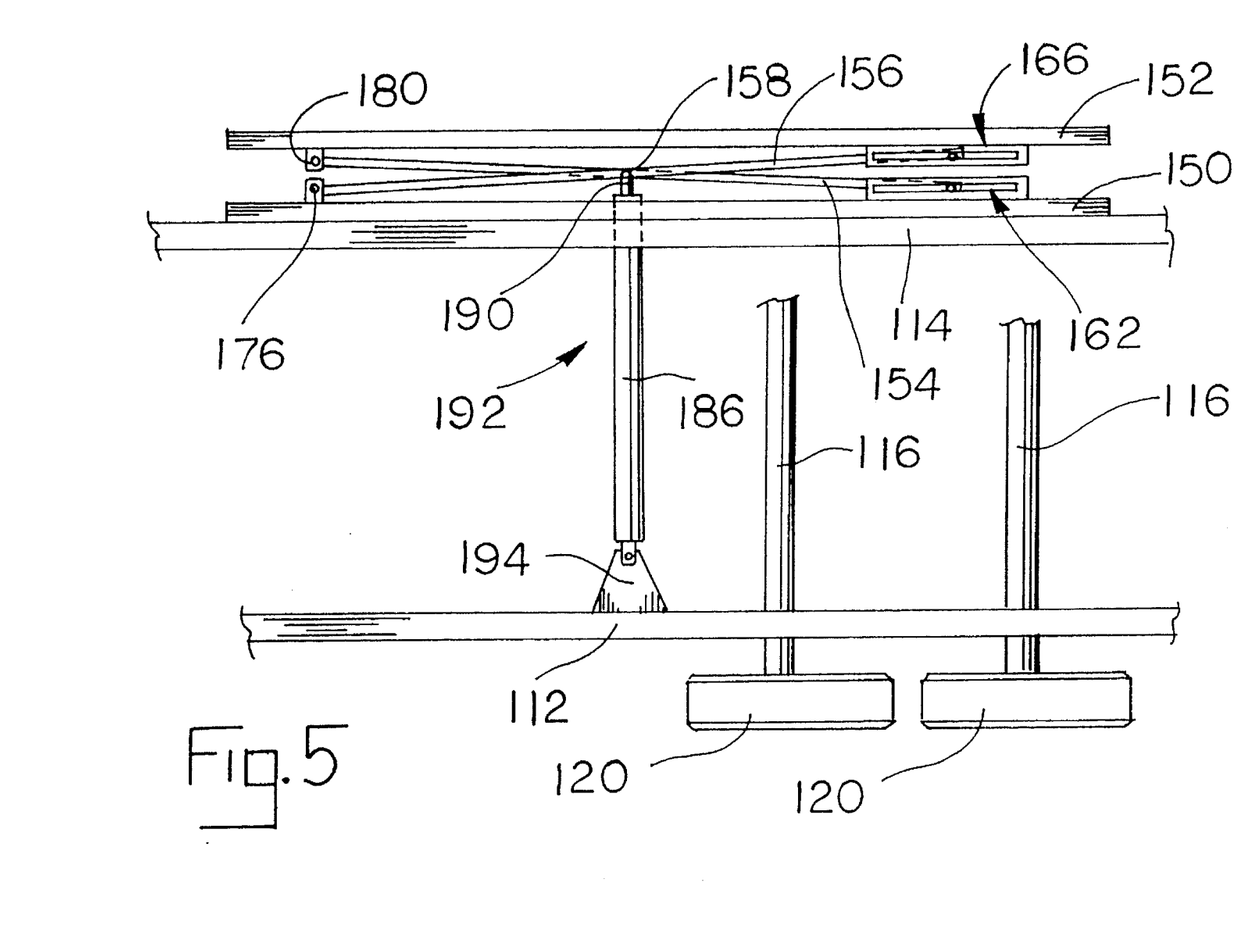
FIG. 5 is a view similar to FIG. 3 but illustrating an alternate embodiment of the present invention.
Figure 6:
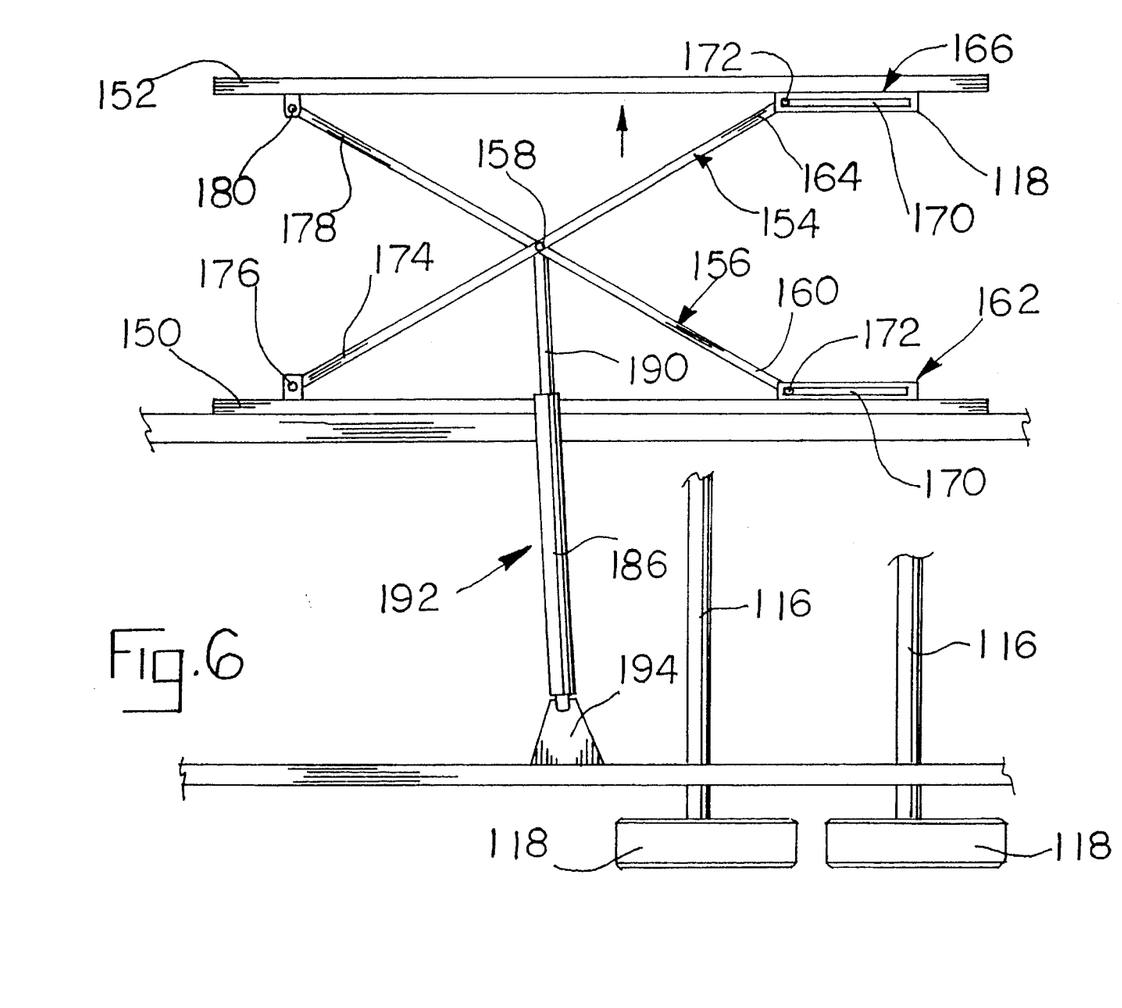
FIG. 6 is a view similar to FIG. 4, illustrating the embodiment of the invention of FIG. 5 in the extended position.

Referring now to the embodiment of FIGS. 5 and 6, elements the same or substantially the same as those in the embodiment of FIGS. 2–4 retain the same reference character, but increased by 100. In the embodiment of FIGS. 5 and 6, the actuator 84 is replaced by an actuator 192, the piston rod 190 of which is secured to the pivot pin 158 which pivotally interconnects the arms 54 and 56. The cylinder 196 is pivotally attached to frame member 112 through pivot support 194, although the cylinder 186 could be attached to the frame 114 by an appropriate pivot connection. The embodiment of FIG. 5 is suitable where the area between the frame members 112 and 114 is clear in the area where the hydraulic actuator 192 must be mounted. The stroke of the actuator is relatively short, since the pivot pin 158 only moves one half of the distance that the retractable room moves. However, the actuator 192 must be installed in a position in which the piston rod 194 can be secured to the pivot pin 158.

Figure 7:
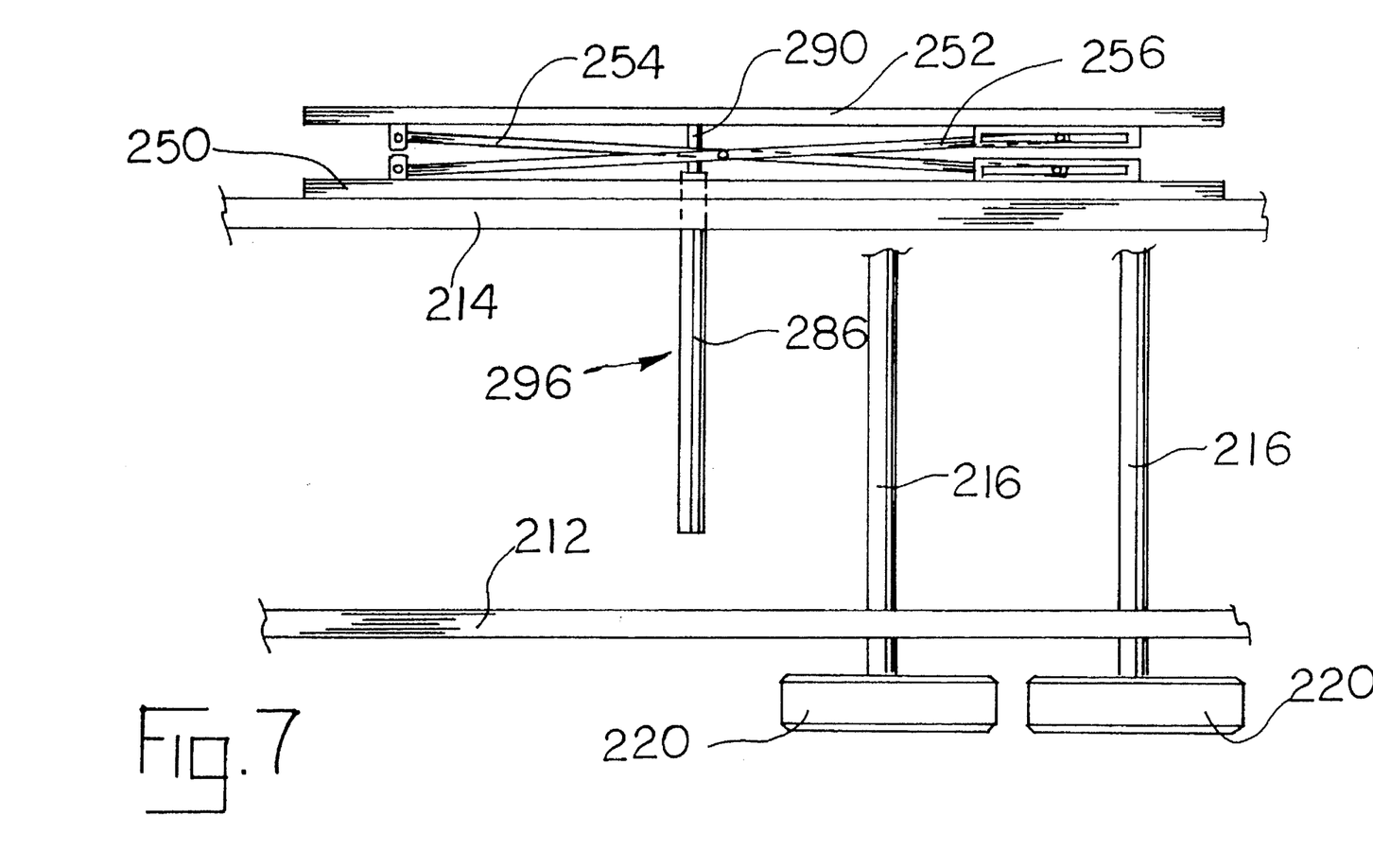
FIG. 7 is a view similar to FIG. 3, but illustrating still another embodiment of the present invention.
Figure 8:
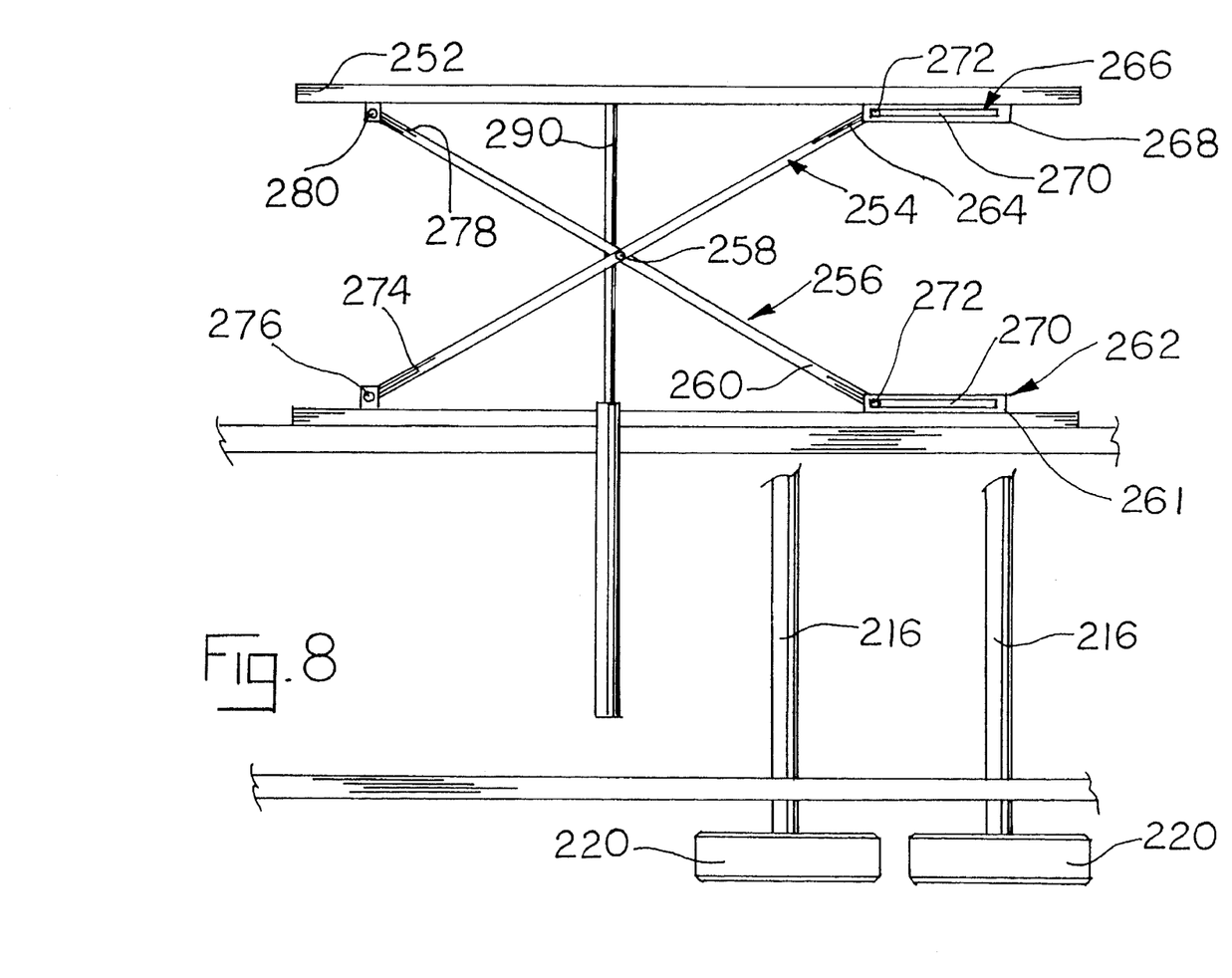
FIG. 8 is a view similar to FIG. 4 but illustrating the embodiment of FIG. 7 with the linkage in the extended position.

Referring now to the embodiment of FIGS. 7 and 8, elements the same or substantially the same as those in the embodiment of FIGS. 2–4 retain the same reference numeral, but increased by 200. In the embodiment of FIGS. 7 and 8, the piston rod 290 of hydraulic actuator 296 is secured directly to subframe 252 which is secured to the slide out or retractable room. The hydraulic cylinder 286 is secured to either the main frame member 214 or subframe member 250 and projects into the area defined between the frame member 214 and the frame member 212. However, the location of the hydraulic actuator 296 may be varied over a reasonably large distance between the distance of the ends of the arms 254, 256. Accordingly, a location can be chosen for the actuator 296 where it will not interfere with other underbody components that might be secured in the area between the frames 212 and 214.

What is claim is:

1. Mobile living quarters comprising a main frame including a pair of main frame members, an axle mounted on said main frame members, a pair of wheels mounted on said axle, main living area defining means including a main floor mounted on said main frame members and walls extending from said floor for defining a main living area, a retractable room mounted for movement in a direction substantially parallel to said main floor from a retracted position retracted into said main living quarters to an extended position extended from said main living area to provide an auxiliary living area, said retractable room including a subframe member facing one of said main frame members and extending substantially parallel thereto, a linkage connected between said one main frame member and said subframe member for guiding said retractable room during extension and retraction thereof, said linkage having a pair of arms, each of said arms having opposite ends, first pivot means securing one end of one of said arms to said main frame and one end of the other arm to said retractable room, second pivot means securing one end of said one arm to said retractable room and the other end of said other arm to said main frame, and actuating means for moving said retractable room between said retracted and extended positions.

2. Mobile living quarters as claimed in claim 1, wherein said linkage is a scissors linkage in which said one arm extends across said other arm between the ends thereof.

3. Mobile living quarters as claimed in claim 1, wherein said first pivot means is a sliding pivot permitting said one ends of said arms to slide relative to said main frame and to said retractable room as the arms pivot about said first pivot means.

4. Mobile living quarters as claimed in claim 3, wherein said first pivot means includes a bracket having an elongated slot and a pivot pin slidable in said slot and pivotable relative to the bracket.

5. Mobile living quarters as claimed in claim 1, wherein said one main frame member includes a face facing said subframe member and said subframe member includes a face facing said one main frame member, said actuating means being mounted on one of said faces and being connected to one of said arms.

6. Mobile living quarters as claimed in claim 1, wherein said actuating means is carried on said main frame and extends across said one main frame member to engage said subframe member.

7. Mobile living quarters as claimed in claim 1, wherein said actuating means is pivotally mounted on said main frame and extends across said one main frame member to engage said linkage.

8. Mobile living quarters as claimed in claim 1, wherein said first pivot means is a sliding pivot permitting said one ends of said arms to slide relative to said main frame and to said retractable room as the arms pivot about said first pivot means.

9. Mobile living quarters as claimed in claim 8, wherein said first pivot means includes a bracket having an elongated slot and a pivot pin slidable in said slot and pivotable relative to the bracket.

10. Mobile living quarters as claimed in claim 8, wherein said one main frame member includes a face facing said subframe member and said subframe member includes a face facing said one main frame member, said actuating means being mounted on one of said faces and being connected to one of said arms through said one pivot means.

11. Mobile living quarters as claimed in claim 8, wherein said actuating means is pivotally mounted on said main frame and extends across said main frame member to engage said linkage.

12. Mobile living quarters comprising a main frame, main living area defining means mounted on said main frame for defining a main living area, a retractable room mounted for movement from a retracted position retracted into said main living quarters to an extended position extended from said main living area to provide an auxiliary living area, a linkage connected between said main frame and said retractable room for guiding said retractable room during extension and retraction thereof, said linkage having a pair of arms, each of said arms having opposite ends, first pivot means securing one end of one of said arms to said main frame and one end of the other arm to said retractable room, second pivot means securing the other end of said one arm to said retractable room and the other end of said other arm to said main frame, and actuating means for moving said retractable room between said retracted and extended positions, said main frame including an elongated main frame member, said retractable room including a subframe member facing the main frame member, said linkage being mounted between the main frame member and said subframe member, said first pivot means being a sliding pivot permitting said one ends of said arms to slide relative to said main frame and to said retractable room as the arms pivot about said first pivot means, said actuating means being carried on said main frame and extending across said main frame member to engage said subframe member.

* * * * *